(12) United States Patent
Mizutani

(10) Patent No.: US 12,449,783 B2
(45) Date of Patent: Oct. 21, 2025

(54) INFORMATION COLLECTING SYSTEM AND INFORMATION COLLECTING METHOD

(71) Applicant: OMRON Corporation, Kyoto (JP)

(72) Inventor: Seiji Mizutani, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 441 days.

(21) Appl. No.: 17/898,973

(22) Filed: Aug. 30, 2022

(65) Prior Publication Data

US 2023/0085335 A1 Mar. 16, 2023

(30) Foreign Application Priority Data

Sep. 14, 2021 (JP) ................................. 2021-149544

(51) Int. Cl.
*G05B 19/05* (2006.01)

(52) U.S. Cl.
CPC .... *G05B 19/052* (2013.01); *G05B 2219/1215* (2013.01); *G05B 2219/15049* (2013.01); *G05B 2219/15069* (2013.01)

(58) Field of Classification Search
CPC .......... G05B 19/052; G05B 2219/1215; G05B 2219/15049; G05B 2219/15069
USPC .......................................................... 700/43
See application file for complete search history.

(56) References Cited

U.S. PATENT DOCUMENTS

| | | | |
|---|---|---|---|
| 5,027,297 A | 6/1991 | Garitty et al. | |
| 2002/0174389 A1* | 11/2002 | Sato | G06F 11/3409 |
| | | | 714/48 |
| 2012/0096195 A1* | 4/2012 | Negishi | H04L 49/9063 |
| | | | 710/34 |
| 2014/0118076 A1 | 5/2014 | Yasukawa | |
| 2014/0350894 A1* | 11/2014 | Yamashita | G01C 23/00 |
| | | | 702/189 |
| 2016/0033990 A1 | 2/2016 | Luciani | |
| 2017/0230126 A1 | 8/2017 | Yamada | |
| 2018/0090988 A1 | 3/2018 | MacCleery et al. | |

(Continued)

FOREIGN PATENT DOCUMENTS

| | | |
|---|---|---|
| CN | 103676724 A | 3/2014 |
| CN | 106576038 A | 4/2017 |

(Continued)

OTHER PUBLICATIONS

Extended European Search Report dated Feb. 16, 2023 in Application No. 22192353.5.

(Continued)

*Primary Examiner* — Md Azad
(74) *Attorney, Agent, or Firm* — Sughrue Mion, PLLC

(57) ABSTRACT

An information collecting system includes a first device including a counter, a second device that collects data from one or more sensing devices in response to a command from the first device, and a third device including a time-measuring unit that manages time. The first device adds, to the data collected by the second device, a first count value output from the counter at a timing when the second device collects the data, to generate a first data set. The third device adds, to the first data set, a correspondence relationship between a time output from the time-measuring unit and a second count value output from the counter of the first device.

18 Claims, 13 Drawing Sheets

(56) References Cited

U.S. PATENT DOCUMENTS

| | | | |
|---|---|---|---|
| 2018/0248638 A1* | 8/2018 | Harada | H04J 3/0638 |
| 2019/0171192 A1* | 6/2019 | Nishiyama | G06F 1/12 |
| 2020/0236517 A1 | 7/2020 | Matsunaga et al. | |
| 2022/0376806 A1 | 11/2022 | Ueda | |

FOREIGN PATENT DOCUMENTS

| | | |
|---|---|---|
| CN | 108572613 A | 9/2018 |
| CN | 113392063 A | 9/2021 |
| JP | 2008-170205 A | 7/2008 |
| JP | 2015219616 A | 12/2015 |
| JP | 2017-21417 A | 1/2017 |
| JP | 2018-138898 A | 9/2018 |
| JP | 2018-151918 A | 9/2018 |
| WO | 2021084771 A1 | 5/2021 |

OTHER PUBLICATIONS

Communication dated Jun. 21, 2024 issued by the State Intellectual Property Office of the P.R. China in application No. 202211018565.3.

Zhang Jun-Tao, et al., "Design and Implementation of wide-band and high-precision frequency meter based on FPGA and Qsys", Journal of Shaanxi University of Science & Technology, vol. 36, No. 6, Dec. 2018, pp. 163-169 (7 pages).

Wang XinLei, "Synchronization Acquisition Method Research for Mechanical Vibration WSNs based on Clock Synchronization", College of Mechanical Engineering of Chongqing University, Chongqing, China, May 2015, pp. 1-69 (77 pages).

Communication dated Mar. 25, 2025 issued by the Japanese Patent Office in application No. 2021-149544.

* cited by examiner

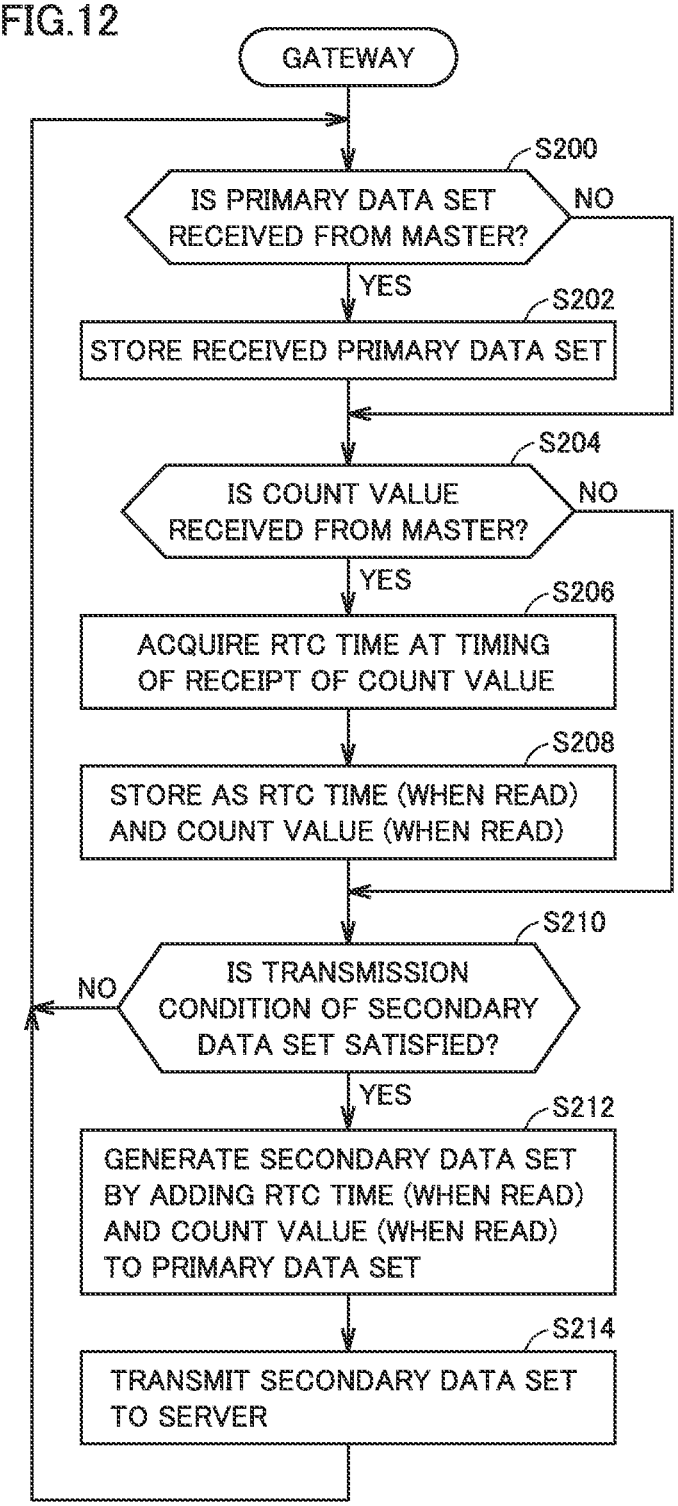

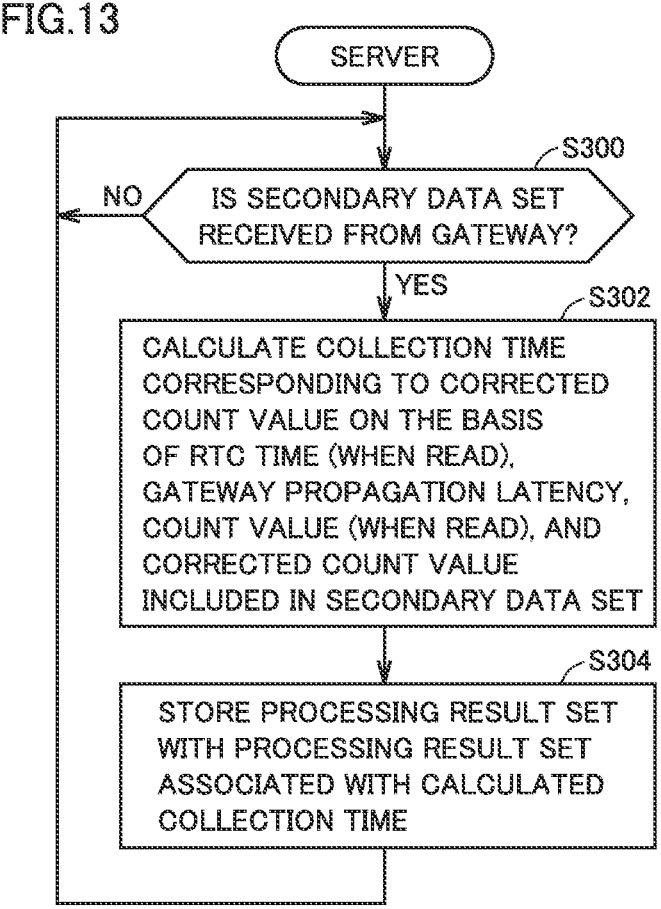

INFORMATION COLLECTING SYSTEM AND INFORMATION COLLECTING METHOD

BACKGROUND OF THE INVENTION

Field of the Invention

The present invention relates to an information collecting system and an information collecting method.

Description of the Background Art

There is known a system that collects data at regular intervals from any sensing device and transfers the data to an upper-level device. In order to analyze the collected data later, it is necessary to manage with high accuracy the timing when the data is collected and time.

For example, Japanese Patent Laying-Open No. 2017-021417 discloses a data collecting device capable of acquiring data at regular intervals over a general-purpose communication network.

Japanese Patent Laying-Open No. 2008-170205 discloses a history recording device suitable for being incorporated in an electronic device having no clock and recording information indicating details of an occurrence of an event and/or an abnormality in the electronic device together with information indicating an occurrence time of the event and/or the abnormality as history information.

Japanese Patent Laying-Open No. 2018-151918 provides a mechanism for facilitating retroactive analysis or examination in a controller provided with a function of collecting and storing data on a control target.

Japanese Patent Laying-Open No. 2018-138898 discloses an information management system capable of correcting with high accuracy time information attached to information on production with consideration given to latency and the like involved in transmission of data over a network.

In order to synchronize a time and a counter between a plurality of devices, it is necessary to perform data communications between target devices in accordance with a time synchronization protocol. However, as the number of devices to be synchronized increases, problems such as an increase in load and cost and an increase in time and effort required for management may arise.

SUMMARY OF THE INVENTION

It is therefore an object of the present invention to enable a configuration capable of managing with higher accuracy time while suppressing an increase in cost involved in time management even when the number of sensing devices used for data collection increases.

An information collecting system according to an embodiment includes a first device including a counter, a second device configured to collect data from one or more sensing devices in response to a command from the first device, and a third device including a time-measuring unit that manages time. The first device is configured to add, to the data collected by the second device, a first count value output from the counter at a timing when the second device collects the data, to generate a first data set. The third device is configured to add, to the first data set, a correspondence relationship between a time output from the time-measuring unit and a second count value output from the counter of the first device.

The information collecting system according to this configuration manages, using the first count value, the timing when the second device collects data from one or more sensing devices, and adds the correspondence relationship between the time output from the time-measuring unit of the third device and the second count value to the first data set. It is possible to calculate, by referring to the correspondence relationship between the time and the second count value, the time when the data is collected on the basis of the first count value, so that time management can be performed with higher accuracy. Further, the use of the time-measuring unit of the third device eliminates the need of increasing the number of the time-measuring units even in a case where a plurality of the first devices and a plurality of the second devices are placed, and thus makes it possible to suppress an increase in cost involved in time management.

The first device may be configured to calculate the first count value by correcting a third count value corresponding to a time when the command is transmitted to the second device using first latency required between the transmission of the command and the collection of the data by the second device. According to this configuration, the time when data is collected can be kept accurate even when there is latency in data transmission between the first device and the second device.

The first latency may be prestored in the first device. According to this configuration, the prestored first latency is usable when the first device generates the first data set, so that the generation processing can be made efficient.

The first device may be configured to transmit, when a predetermined condition is satisfied, a count value output from the counter to the third device as the second count value. The third device may be configured to associate a time output from the time-measuring unit when the second count value is received from the first device with the second count value thus received. According to this configuration, the third device only needs to acquire the corresponding time at the timing when the second count value is received from the first device, which eliminates the need of implementing processing of managing the generation interval of the correspondence relationship between the time and the second count value in the second device.

The first device may be configured to transmit, to the third device, second latency required between the transmission of the count value from the first device and the receipt of the count value by the third device. According to this configuration, the correspondence relationship between the time and the second count value can be determined more accurately.

The first device may be configured to generate the first data set from a processing result obtained by performing a predetermined operation on the data collected from the one or more sensing devices. According to this configuration, rather than using the data collected from one or more sensing devices as it is, any preprocessing or the like according to the purpose of the use of the data may be performed on the data.

The third device may be configured to transmit, to a fourth device, a second data set including the time output from the time-measuring unit, the second count value corresponding to the time, and data collected by the second device at each of a plurality of timings. According to this configuration, the fourth device can centrally manage the data collected by a plurality of the second devices.

The fourth device may be configured to calculate a time corresponding to the first count value. According to this configuration, a time when data is collected can be set to the data, so that data analysis and the like can be performed more efficiently.

The third device may be configured to add the time output from the time-measuring unit and the second count value corresponding to the time to some of a plurality of the first data sets. According to this configuration, the time output from the time-measuring unit and the second count value corresponding to the time can be efficiently transmitted.

According to another embodiment, provided is an information collecting method that is performed by an information collecting system including a first device, the first device including a counter. The information collecting method includes collecting, by a second device, data from one or more sensing devices in response to a command from the first device, adding, by the first device, a first count value output from the counter at a timing when the second device collects the data to the data collected by the second device, to generate a first data set, and adding, by a third device including a time-measuring unit configured to manage time, a correspondence relationship between a time output from the time-measuring unit and a second count value output from the counter of the first device to the first data set.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 12 is a flowchart illustrating an example of a processing procedure to be performed by the gateway of the information collecting system according to the present embodiment.

FIG. 13 is a flowchart illustrating an example of a processing procedure to be performed by the server of the information collecting system according to the present embodiment.

DESCRIPTION OF THE PREFERRED EMBODIMENTS

Figure 1:
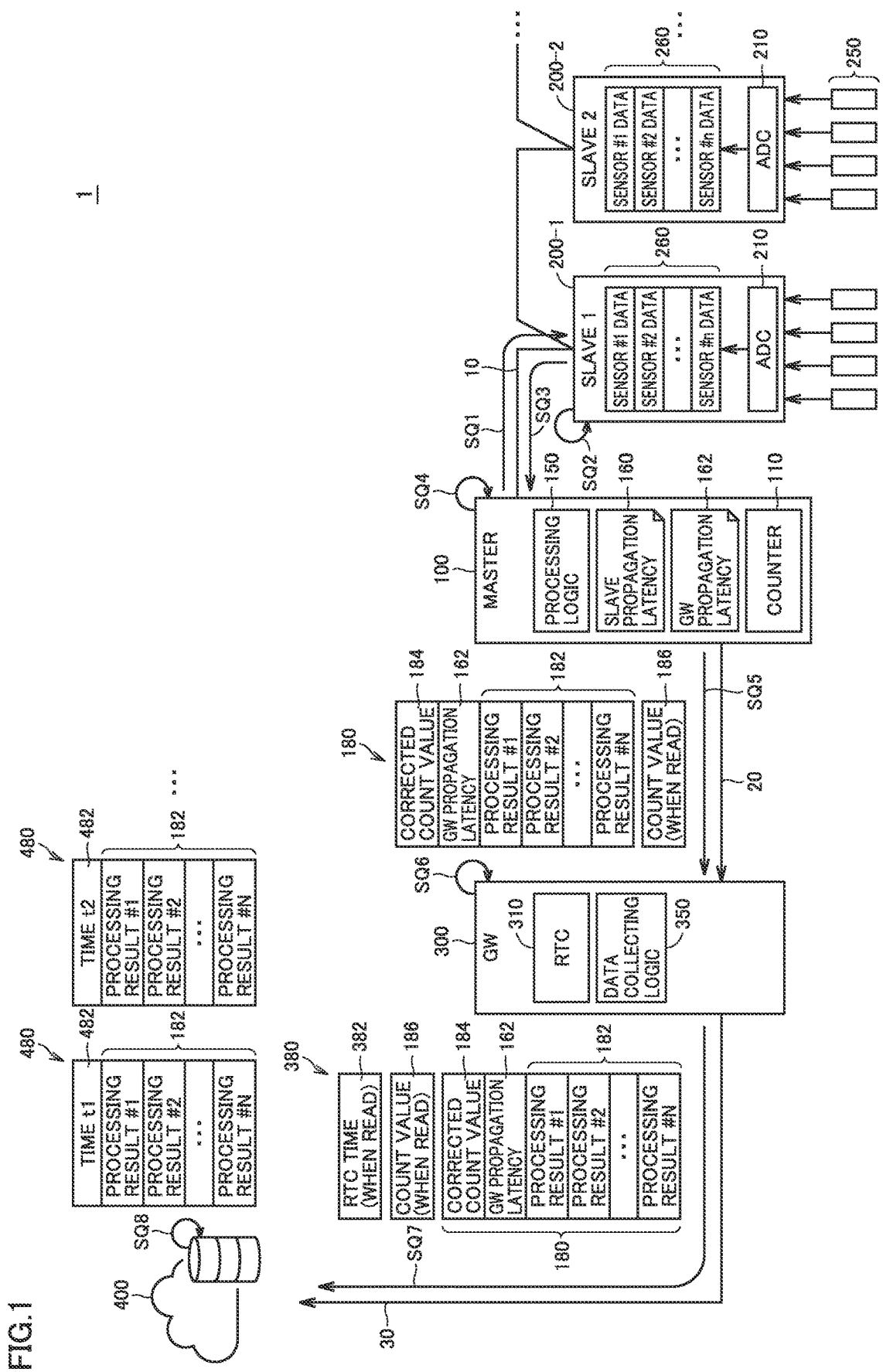
FIG. 1 is a diagram schematically illustrating an example of a configuration of an information collecting system according to the present embodiment.

An embodiment of the present technology will be described in detail with reference to the drawings. Note that the same or corresponding parts in the drawings are denoted by the same reference numerals, and no redundant description will be given of such parts.

A. Application Example

First, an example of a case to which the present invention is applied will be described. An information collecting system 1 is capable of collecting any data and managing a time when the data is collected.

FIG. 1 is a diagram schematically illustrating an example of a configuration of information collecting system 1 according to the present embodiment. With reference to FIG. 1, information collecting system 1 includes a master 100 (first device), one or more slaves 200-1, 200-2, . . . (hereinafter, also collectively referred to as "slave 200") (second device), a gateway (GW) 300 (third device), and a server 400 (third device/fourth device).

Master 100 is electrically connected to one or more slaves 200 over a communication line 10.

Each slave 200 collects any data from one or more sensing devices 250. Each sensing device 250 includes any device that acquires data from a field. Sensing device 250 is a sensor that measures a physical phenomenon such as a temperature sensor, a pressure sensor, a current sensor, a distance sensor, or an image sensor.

Each slave 200 includes an analog-to-digital converter (ADC) 210 that converts a signal output from sensing device 250 into a digital value. Each slave 200 collects data measured by sensing device 250 for each event or at regular intervals. In the following description, as an example, master 100 transmits a data collection command to slave 200 (sequence SQ1), and slave 200 collects data from one or more sensing devices 250 in response to the data collection command (sequence SQ2). Each slave 200 generates a raw data set 260 from the data collected from sensing device 250 and transmits raw data set 260 thus generated to master 100 (sequence SQ3).

Note that each slave 200 may collect the data from sensing device 250 at predetermined intervals to generate raw data set 260.

Master 100 includes a counter 110 and processing logic 150. Counter 110 outputs a count value used for managing the collection time of raw data set 260. Counter 110 includes, for example, a free-run counter that is incremented or decremented at predetermined intervals.

Processing logic 150 of master 100 generates a primary data set 180 (sequence SQ4). At this time, processing logic 150 adds a count value output from counter 110 at a timing when slave 200 collects the data (raw data set 260) to the data (raw data set 260) collected by slave 200 to generate primary data set 180.

More specifically, processing logic 150 performs an operation on raw data set 260 output from slave 200 as necessary, and outputs a processing result set 182. Examples of the operation executed as described above include smoothing processing such as moving average processing, and maximum value or minimum value extraction processing. Note that there is a case where no operation is performed, and raw data set 260 is output as it is as processing result set 182.

Processing logic 150 refers to prestored slave propagation latency 160 to calculate a corrected count value 184 indicating the time when raw data set 260 is collected by slave 200. Here, slave propagation latency 160 indicates a time delay required between the transmission of the data collection command from master 100 to slave 200 and the collection of the data by slave 200.

Processing logic 150 of master 100 transmits the data collection command to slave 200 to acquire a count value output from counter 110 at the timing of the transmission. Then, processing logic 150 adds slave propagation latency 160 to the count value thus acquired to calculate corrected count value 184 indicating the time when data included in a corresponding raw data set 260 is collected. As described above, processing logic 150 calculates corrected count value 184 by correcting the count value when the data collection command is transmitted to slave 200 using slave propagation latency 160.

Note that in a case where a plurality of slaves 200 are connected to master 100, slave propagation latency 160 may be set for each slave 200. Furthermore, in a case where analog-to-digital converter 210 is implemented by a multiplexer, slave propagation latency 160 may be set for each sensing device 250 (channel).

Further, processing logic 150 refers to prestored slave propagation latency 160 to calculate corrected count value 184 indicating the time when raw data set 260 is collected by slave 200. More specifically, processing logic 150 transmits the data collection command to slave 200 to acquire a count value output from counter 110 at the timing of the transmission. Then, processing logic 150 adds slave propagation latency 160 to the count value thus acquired to calculate corrected count value 184 indicating the time when data included in a corresponding raw data set 260 is collected. That is, slave propagation latency 160 reflects a time delay between the transmission of the data collection command from master 100 to slave 200 and the actual collection of the data.

Further, processing logic 150 transmits prestored gateway propagation latency 162 to gateway 300 with gateway propagation latency 162 included in primary data set 180, for example. Gateway propagation latency 162 is information indicating the magnitude of propagation latency between gateway 300 and master 100. More specifically, gateway propagation latency 162 corresponds to a time delay required between the transmission of the count value from master 100 and the receipt of the count value by gateway 300.

Gateway 300 includes a real time clock (RTC) 310 and a data collecting logic 350. RTC 310 manages time and outputs the current time in response to a command. The time output from RTC 310 is associated with the count value output from counter 110 of master 100.

RTC 310 may keep the time accurate in accordance with a time synchronization protocol such as IEEE 1588, a network time protocol (NTP), or a simple network time protocol (SNTP).

More specifically, data collecting logic 350 reads primary data set 180 (corrected count value 184, gateway propagation latency 162, and processing result set 182) from master 100, and further reads the count value output from counter 110 of master 100 (sequence SQ5). Note that the count value thus read is referred to as "count value (when read) 186".

Further, data collecting logic 350 acquires an RTC time (hereinafter, referred to as "RTC time (when read) 382") output from RTC 310 at the timing when primary data set 180 is read from master 100.

That is, gateway 300 adds, to primary data set 180, a correspondence relationship between the RTC time (RTC time (when read) 382) output from RTC 310 and the count value (count value (when read) 186) output from counter 110 of master 100. As described above, associating the count value (when read) 186 output from counter 110 of master 100 with the RTC time output from RTC 310 of gateway 300 makes it possible to assign the actual time to the count value output from counter 110 of master 100.

Data collecting logic 350 of gateway 300 adds RTC time (when read) 382 and count value (when read) 186 to primary data set 180 (corrected count value 184, gateway propagation latency 162, and processing result set 182) read from master 100 to generate secondary data set 380 (sequence SQ6), and transmits secondary data set 380 to server 400 (sequence SQ7).

Server 400 extracts processing result set 182 from secondary data set 380 and calculates a collection time 482 indicating a collection time to generate a collection data set 480 for each time (sequence SQ8). More specifically, server 400 refers to the correspondence relationship between RTC time (when read) 382 and count value (when read) 186 to calculate collection time 482 corresponding to corrected count value 184.

When propagation latency between master 100 and gateway 300 cannot be ignored, RTC time (when read) 382 or count value (when read) 186 may be compensated on the basis of gateway propagation latency 162. In this case, server 400 associates a corrected RTC time obtained by subtracting gateway propagation latency 162 from RTC time (when read) 382 with count value (when read) 186.

As described above, in information collecting system 1 according to the present embodiment, master 100, one or more slaves 200, gateway 300, and server 400 can cooperate with each other to collect any data and manage the time when the data is collected.

B. Example of Hardware Configuration of Information Collecting System 1

Next, an example of a hardware configuration of information collecting system 1 will be described.

b1: Master 100

Figure 2:
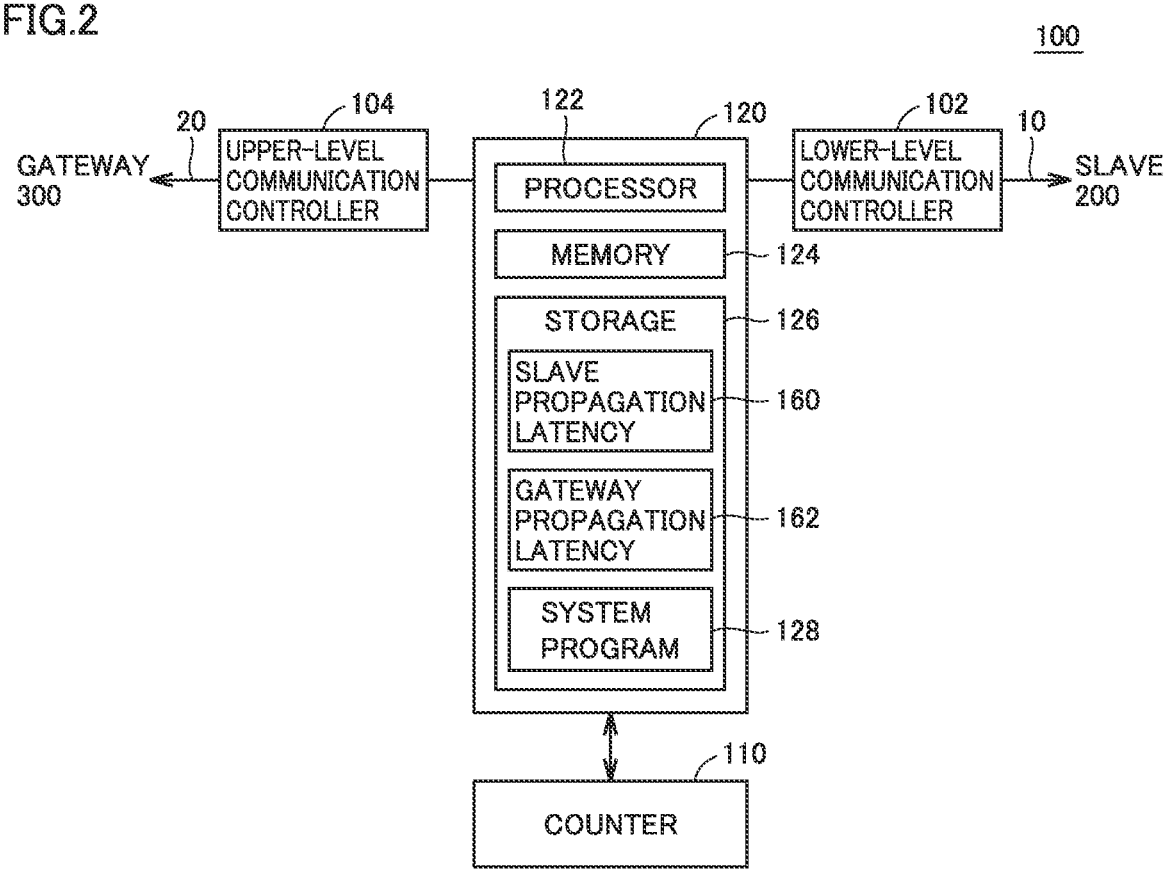
FIG. 2 is a diagram schematically illustrating an example of a hardware configuration of a master of the information collecting system according to the present embodiment.

FIG. 2 is a diagram schematically illustrating an example of a hardware configuration of master 100 of information collecting system 1 according to the present embodiment. With reference to FIG. 2, master 100 includes a lower-level communication controller 102, an upper-level communication controller 104, counter 110, and a processing unit 120 as main components.

Lower-level communication controller 102 is responsible for establishing data communications with one or more slaves 200. For data communications between lower-level communication controller 102 and slave 200, a bus such as a serial peripheral interface (SPI) may be used, for example.

Upper-level communication controller 104 is responsible for establishing data communications with gateway 300. For data communications between upper-level communication controller 104 and gateway 300, a serial communication interface such as Ethernet (registered trademark) or RS-485 may be used, for example.

Counter 110 is a free-run counter that includes an oscillator and is incremented or decremented at predetermined intervals (for example, 1 ms).

Processing unit 120 is an operation circuit that implements processing logic 150 of master 100. More specifically, processing unit 120 includes a processor 122, a memory 124, and a storage 126.

Processor 122 includes a central processing unit (CPU), a graphics processing unit (GPU), or the like. Memory 124 includes, for example, a volatile storage device such as a dynamic random access memory (DRAM) or a static random access memory (SRAM). Storage 126 includes, for example, a non-volatile storage device such as a flash memory.

Storage 126 stores slave propagation latency 160 and gateway propagation latency 162 in addition to a system program 128 to be executed by processor 122. Note that slave propagation latency 160 and gateway propagation latency 162 stored in storage 126 may be updatable by an external device.

b2: Slave 200

Figure 3:
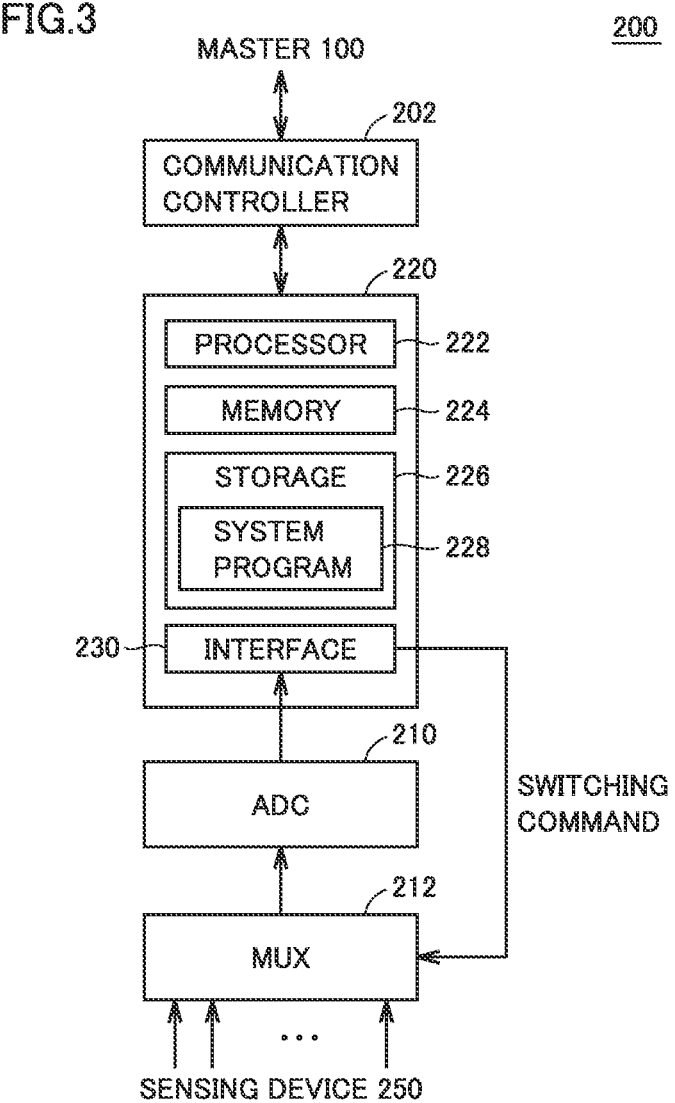
FIG. 3 is a diagram schematically illustrating an example of a hardware configuration of a slave of the information collecting system according to the present embodiment.

FIG. 3 is a diagram schematically illustrating an example of a hardware configuration of slave 200 of information collecting system 1 according to the present embodiment. With reference to FIG. 3, slave 200 includes a communication controller 202, analog-to-digital converter 210, a multiplexer 212, and a processing unit 220 as main components.

Communication controller 202 is responsible for establishing data communications with master 100.

Analog-to-digital converter 210 converts a signal output from sensing device 250 into a digital value.

Multiplexer 212 electrically connects one of a plurality of sensing devices 250 to analog-to-digital converter 210 in accordance with a switching command from an interface 230 of processing unit 220.

Processing unit 220 is an operation circuit that implements main processing of slave 200. More specifically, processing unit 220 includes a processor 222, a memory 224, and a storage 226.

Processor 222 includes a micro controller unit (MCU) or the like. Memory 224 includes, for example, a volatile storage device such as a DRAM or an SRAM. Storage 226 includes, for example, a non-volatile storage device such as a flash memory.

Storage 226 stores a system program 228 to be executed by processor 222.

Note that a more simplified hardware configuration in which communication controller 202 and analog-to-digital converter 210 are integrated together without processing unit 220 may be employed.

b3: Gateway 300

Figure 4:
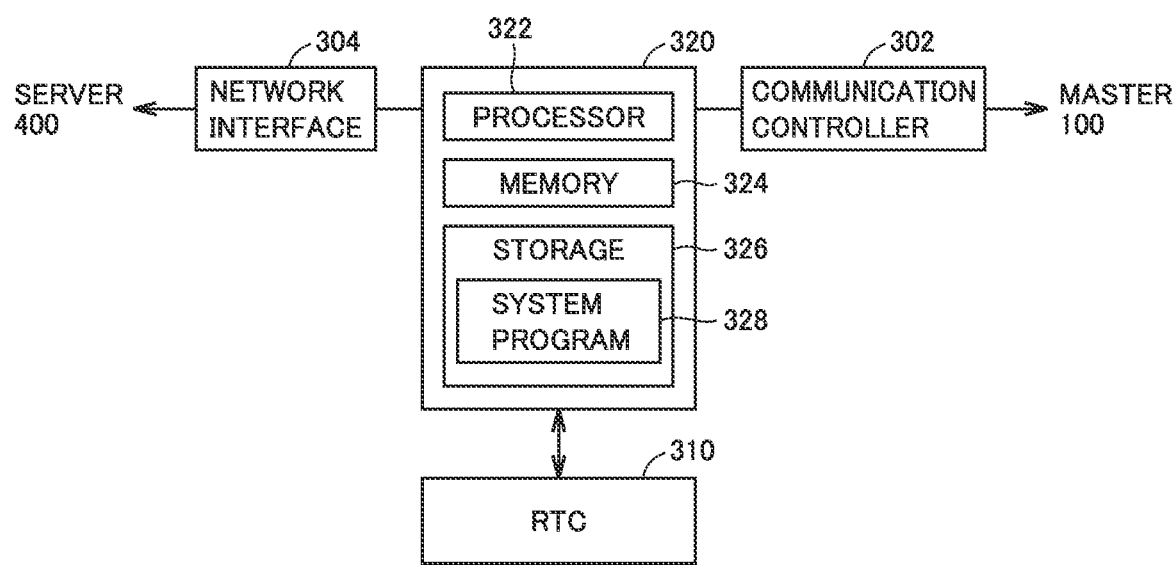
FIG. 4 is a diagram schematically illustrating an example of a hardware configuration of a gateway of the information collecting system according to the present embodiment.

FIG. 4 is a diagram schematically illustrating an example of a hardware configuration of gateway 300 of information collecting system 1 according to the present embodiment. With reference to FIG. 4, gateway 300 includes a communication controller 302, a network interface 304, RTC 310, and a processing unit 320 as main components.

Communication controller 302 is responsible for establishing data communications with master 100.

Network interface 304 is responsible for establishing data communications with server 400. For data communications between network interface 304 and server 400, an interface such as Ethernet (registered trademark) may be used, for example.

RTC 310 is a time-measuring unit that manages time.

Processing unit 320 is an operation circuit that implements data collecting logic 350 of gateway 300. More specifically, processing unit 320 includes a processor 322, a memory 324, and a storage 326.

Processor 322 includes a CPU, a GPU, or the like. Memory 324 includes, for example, a volatile storage device such as a DRAM or an SRAM. Storage 326 includes, for example, a non-volatile storage device such as a flash memory.

Storage 326 stores a system program 328 to be executed by processor 322.

b4: Server 400

Figure 5:
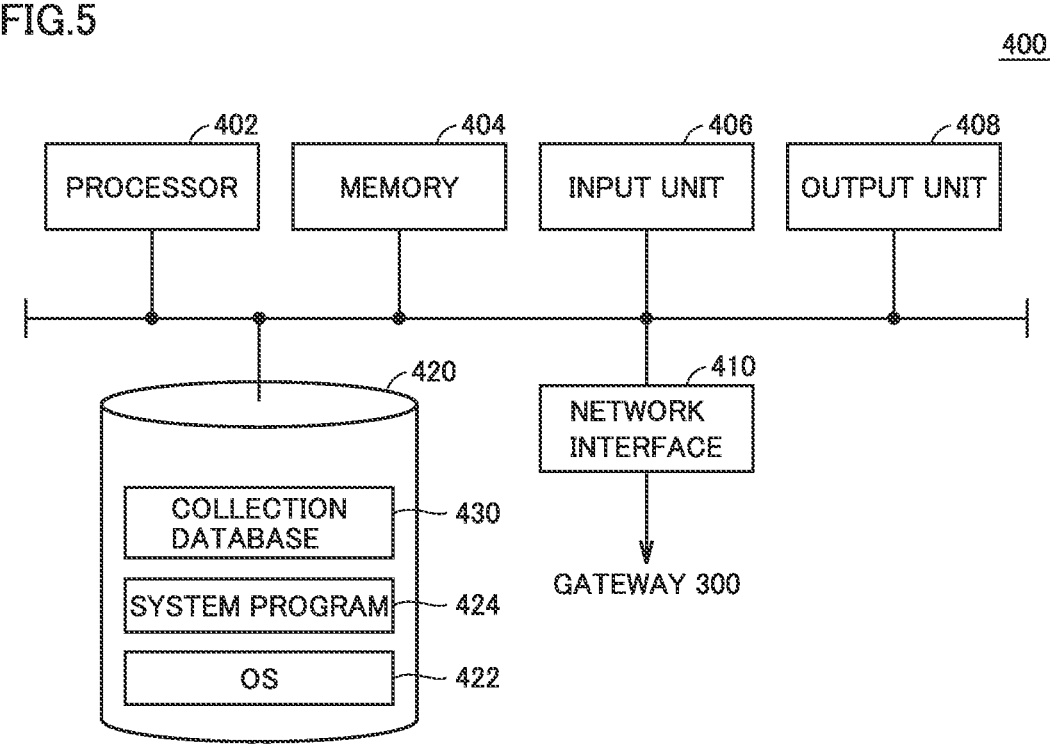
FIG. 5 is a diagram schematically illustrating an example of a hardware configuration of a server of the information collecting system according to the present embodiment.

FIG. 5 is a diagram schematically illustrating an example of a hardware configuration of server 400 of information collecting system 1 according to the present embodiment. As an example, server 400 is implemented by hardware (for example, a general-purpose personal computer) adhering to a standard architecture.

With reference to FIG. 5, server 400 includes a processor 402, a memory 404, an input unit 406, an output unit 408, a network interface 410, and a storage 420 as main components.

Processor 402 includes a CPU, a GPU, or the like. Memory 404 includes, for example, a volatile storage device such as a DRAM or an SRAM. Storage 420 includes, for example, a non-volatile storage device such as a hard disk drive (HDD) or a solid state drive (SSD).

Storage 420 stores an OS 422 and a system program 424 to be executed by processor 402. Furthermore, storage 420 may have an area allocated to a collection database 430 used for storing collection data set 480.

Network interface 410 is responsible for establishing data communications with gateway 300.

Input unit 406 includes a keyboard, a mouse, or the like, and receives a user operation. Output unit 408 includes a display, various indicators, a printer, or the like, and outputs a processing result and the like received from processor 402.

Note that all or some functions provided by server 400 may be implemented via computing resources, called a cloud, provided on a network.

b5: Other Embodiments

FIGS. 2 to 5 illustrate the configuration examples where one or more processors execute a program to provide necessary functions, but some or all of the functions thus provided may be implemented by a dedicated hardware circuit (for example, an application specific integrated circuit (ASIC), a field-programmable gate array (FPGA), or the like).

The programs stored in the storages illustrated in FIGS. 2 to 5 may be each installed from a storage medium (for example, a memory card, a DVD, or the like) that non-transiently stores a computer-readable program. Alternatively, the programs may be each acquired from a download server or the like on the network and installed.

C. Processing of Generating Primary Data Set 180 (Sequences SQ1 to SQ4)

Next, processing of generating primary data set 180 by master 100 and slave 200 (sequences SQ1 to SQ4 illustrated in FIG. 1) will be described.

Figure 6:
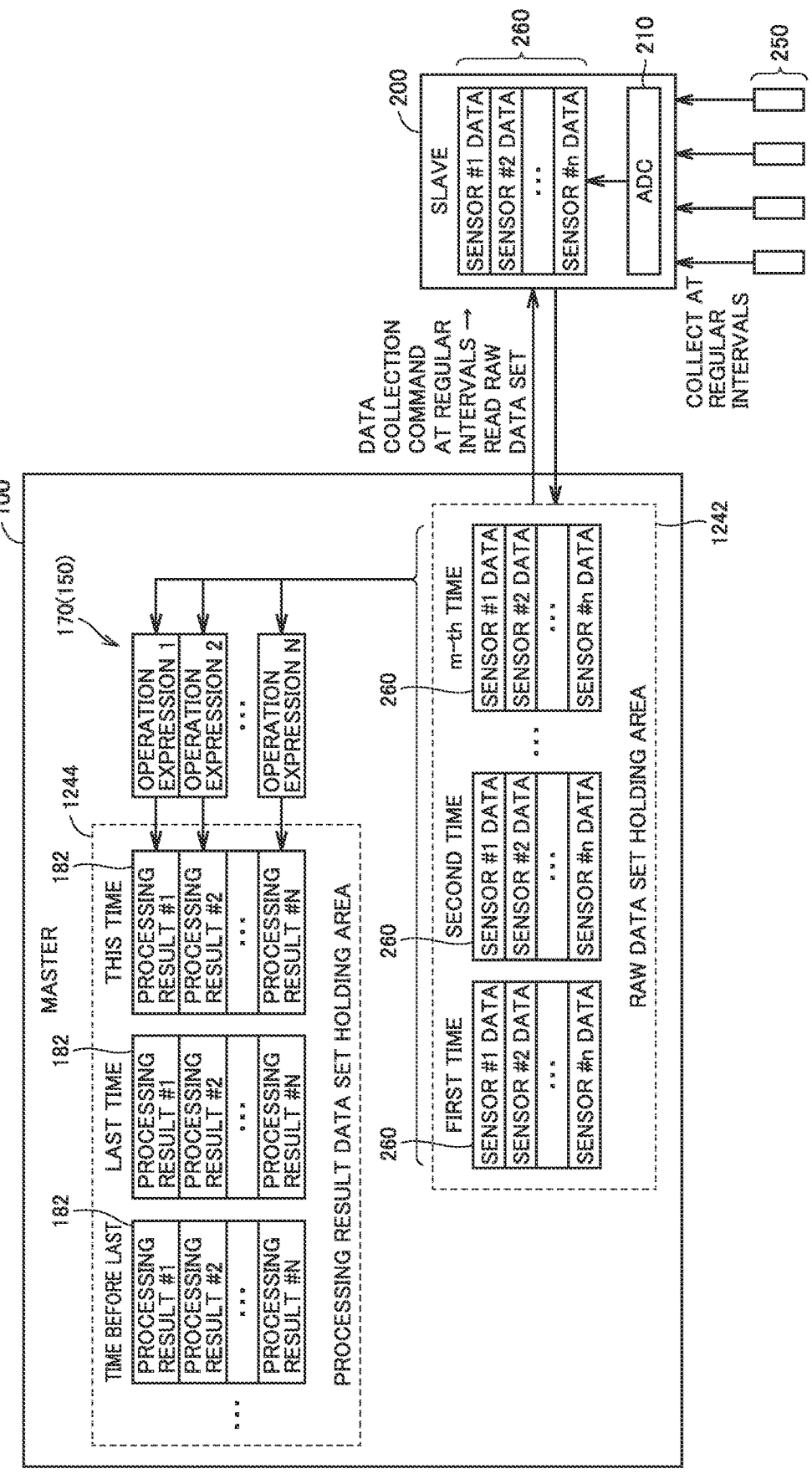
FIG. 6 is a diagram for describing processing of generating a primary data set in the information collecting system according to the present embodiment.

FIG. 6 is a diagram for describing processing of generating primary data set 180 in information collecting system 1 according to the present embodiment. With reference to FIG. 6, each slave 200 collects data from one or more sensing devices 250 at predetermined intervals. The predetermined intervals at which data is collected from sensing device 250 are, for example, about several 10 μsec to several msec, and are sufficiently shorter than the intervals at which the data collection command is transmitted.

Master 100 transmits the data collection command to slave 200 at the predetermined intervals. Slave 200 transmits raw data set 260 to master 100 in response to the data collection command.

Master 100 has a raw data set holding area 1242 used for holding one or more raw data sets 260. In raw data set holding area 1242, a predetermined number of (for example, n) raw data sets 260 are held. Raw data set holding area 1242 configured as a ring buffer holds a predetermined number of the latest raw data sets 260.

Master 100 has an operation expression set 170 that is a part of processing logic 150. Operation expression set 170 includes one or more operation expressions, and one or more raw data sets 260 held in raw data set holding area 1242 are input into each of the operation expression. To the operation expressions, for example, any operation processing such as smoothing processing or statistical processing can be set.

A set of processing results output from each of the operation expressions is output as processing result set 182.

Master 100 has a processing result set holding area 1244 used for holding one or more processing result sets 182. In processing result set holding area 1244, a predetermined number of processing result sets 182 are held. Processing result set holding area 1244 configured as a ring buffer holds a predetermined number of the latest processing result sets 182.

Note that raw data set holding area 1242 and processing result set holding area 1244 may be provided using a part of memory 124 of master 100. Further, the number of raw data sets 260 held in raw data set holding area 1242, the number and contents of the operation expressions included in operation expression set 170, and the number of processing result sets 182 held in processing result set holding area 1244 may be designed as desired, or may dynamically change according to circumstances.

As described above, master 100 generates primary data set 180 from processing results obtained by performing a predetermined operation on the data collected from one or more sensing devices 250.

As illustrated in FIG. 1, primary data set 180 includes corrected count value 184 in addition to processing result set 182. Next, an example of processing of calculating corrected count value 184 will be described.

Figure 7:
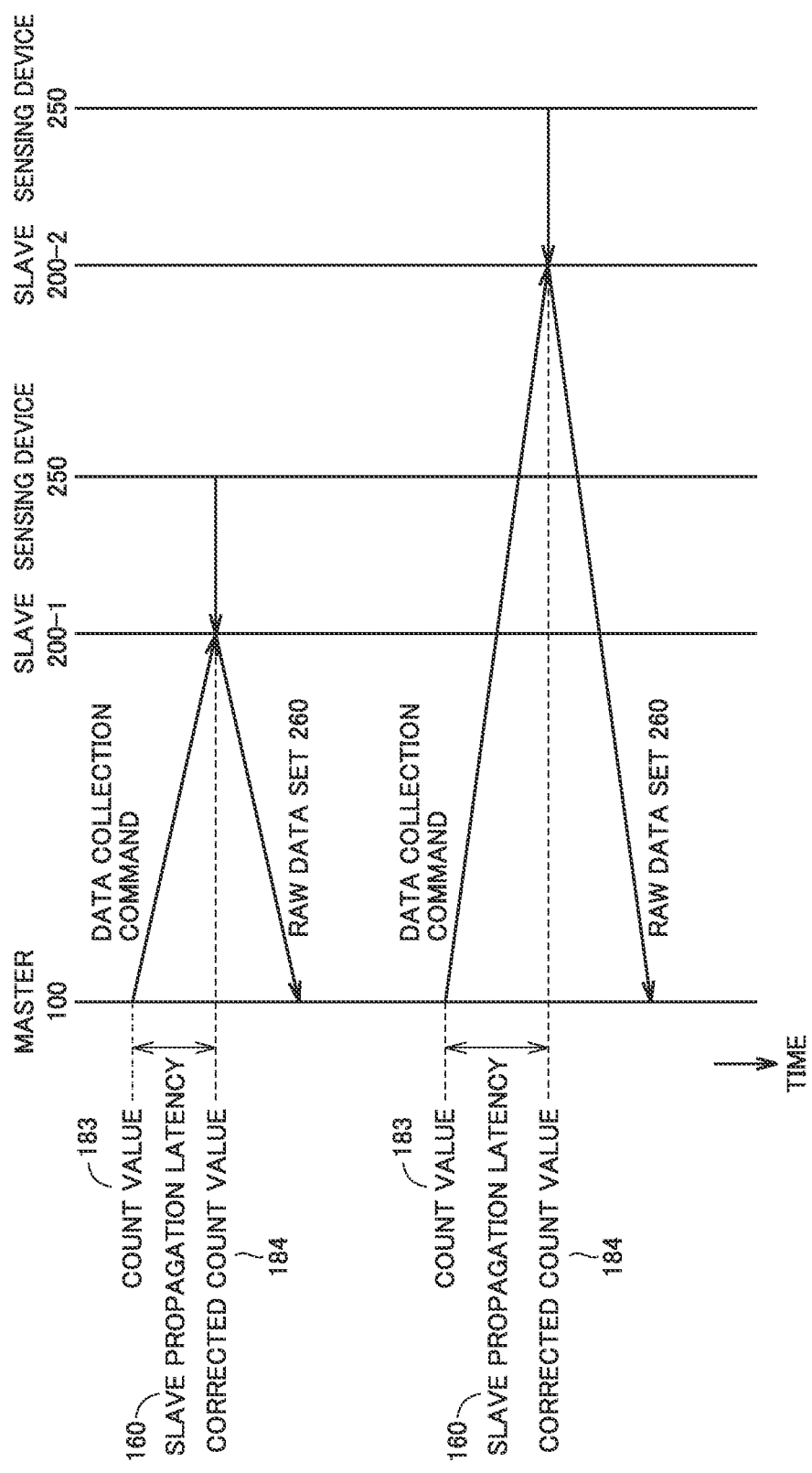
FIG. 7 is a diagram for describing processing of calculating a corrected count value in the information collecting system according to the present embodiment.

FIG. 7 is a diagram for describing processing of calculating corrected count value 184 in information collecting system 1 according to the present embodiment. With reference to FIG. 7, master 100 transmits the data collection command to slave 200 to read raw data set 260 from slave 200.

Propagation latency is present in the propagation of the data collection command from master 100 to slave 200. Slave 200 generates and transmits raw data set 260 to master 100 at the timing of the receipt of the data collection command, or transmits raw data set 260 that has already been generated to master 100 at the timing of the receipt of the data collection command.

Raw data set 260 transmitted to master 100 can be regarded as data generated at the timing of the arrival of the data collection command at slave 200. The time when the data collection command arrives at slave 200 corresponds to a time later than the time when master 100 transmits the data collection command by slave propagation latency 160.

Therefore, upon transmission of the data collection command to slave 200, master 100 acquires count value 183 (current value) output from counter 110 at the timing of the transmission. It is possible to calculate, by adding slave propagation latency 160 to count value 183 thus acquired, corrected count value 184 indicating the time when data included in a corresponding raw data set 260 is collected. That is, master 100 calculates corrected count value 184 in accordance with corrected count value 184=count value 183 (current value)+slave propagation latency 160.

Note that slave propagation latency 160 is preset according to the accuracy of the count value output from counter 110.

As illustrated in FIG. 7, in a case where master 100 is connected to one or more slaves 200, a distance from master 100 possibly differs for each slave 200. In this case, latency also differs for each slave 200. Therefore, slave propagation latency 160 may be preset for each slave 200. For example, slave propagation latency 160-1 for slave 200-1 and slave propagation latency 160-2 for slave 200-2 may be prepared.

Preparing slave propagation latency 160 for each slave 200 as described above makes it possible to calculate corrected count value 184 with higher accuracy.

In accordance with the processing procedure as described above, primary data set 180 including processing result set 182 and corrected count value 184 can be generated. Note that how gateway propagation latency 162 included in primary data set 180 is used will be described later.

D. Processing of Generating and Transmitting Secondary Data Set 380 (Sequences SQ5 to SQ7)

Next, processing of generating secondary data set 380 (sequences SQ5 and SQ6 illustrated in FIG. 1) and processing of transmitting secondary data set 380 (sequence SQ7 illustrated in FIG. 1) performed by gateway 300 and master 100 will be described.

Information collecting system 1 according to the present embodiment determines the time corresponding to corrected count value 184 included in primary data set 180 to calculate collection time 482 indicating the time when processing result set 182 included in primary data set 180 is collected.

In a case where RTC 310 of gateway 300 is used, gateway 300 associates the RTC time output from RTC 310 with the count value output from counter 110 at any timing. The time corresponding to corrected count value 184 can be calculated using such a correspondence relationship.

Figure 8:
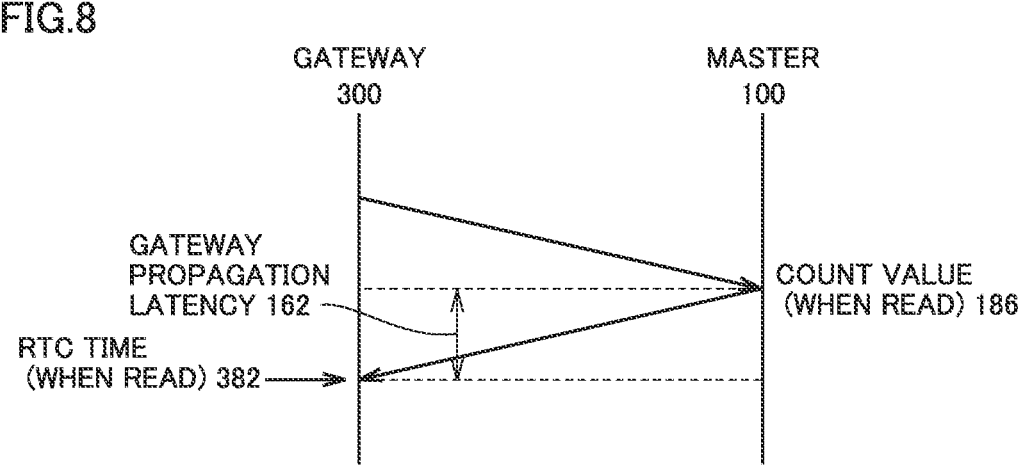
FIG. 8 is a diagram for describing processing of associating a count value with an RTC time in the information collecting system according to the present embodiment.

FIG. 8 is a diagram for describing processing of associating the count value with the RTC time in information collecting system 1 according to the present embodiment.

With reference to FIG. 8, gateway 300 reads the count value of master 100 at any timing. Note that the reading of the count value by gateway 300 may be triggered by the issuance of an explicit command from gateway 300 to master 100, or master 100 may transmit the count value to gateway 300 at predetermined intervals.

Upon receipt of the count value from master 100, gateway 300 acquires the RTC time (RTC time (when read) 382) output from RTC 310 at the timing of the receipt.

At this time, some propagation latency is present in the propagation of the count value (count value (when read) 186) from master 100 to gateway 300. This propagation latency corresponds to gateway propagation latency 162.

Therefore, a correspondence relationship of "count value (when read) 186=RTC time (when read) 382-gateway propagation latency 162" is established. With reference to this correspondence relationship, the time corresponding to corrected count value 184 is calculated.

Gateway 300 adds the count value (when read) 186 read from master 100 and corresponding RTC time (when read) 382 to primary data set 180 to generate secondary data set 380. Then, gateway 300 transmits secondary data set 380 thus generated to server 400.

Note that gateway 300 may read, from master 100, both primary data set 180 and count value (when read) 186, or may read count value (when read) 186 at a timing different from the timing of reading of primary data set 180. For example, gateway 300 may read, at regular intervals, count value (when read) 186 from master 100 independently of the reading of primary data set 180.

Therefore, some secondary data sets 380 may include only primary data set 180. That is, gateway 300 may transmit, to server 400, secondary data set 380 including neither RTC time (when read) 382 nor count value (when read) 186.

Figure 9:
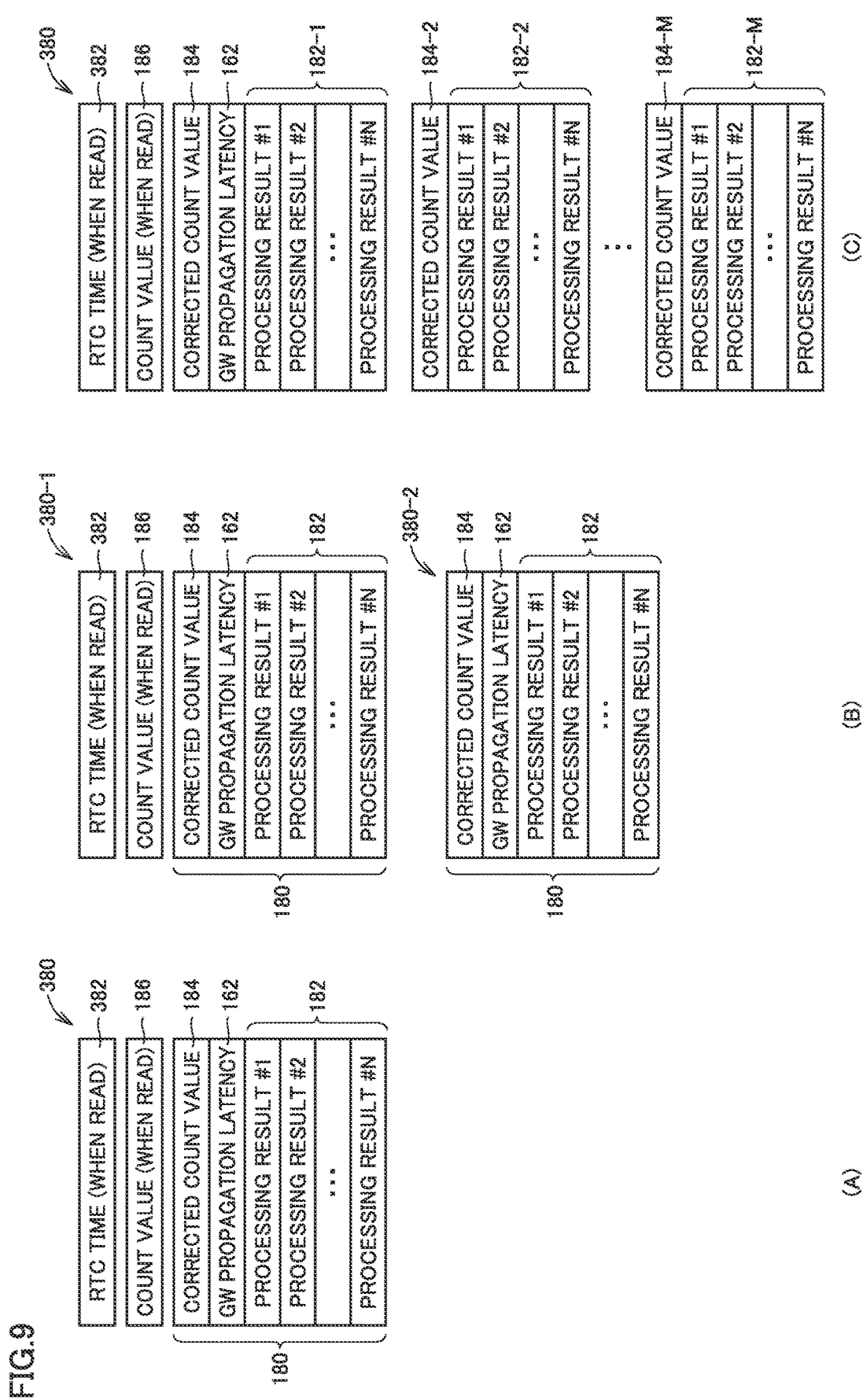
FIG. 9 is a diagram schematically illustrating an example of a configuration of a secondary data set in the information collecting system according to the present embodiment.

FIG. 9 is a diagram schematically illustrating an example of a configuration of secondary data set 380 in information collecting system 1 according to the present embodiment. With reference to FIG. 9(A), secondary data set 380 includes RTC time (when read) 382 and count value (when read) 186 in addition to primary data set 180 (corrected count value 184, gateway propagation latency 162, and processing result set 182).

With reference to FIG. 9(B), a secondary data set 380-1 includes RTC time (when read) 382 and count value (when read) 186, but a subsequent secondary data set 380-2 need not necessarily include RTC time (when read) 382 and count value (when read) 186. Gateway 300 may add RTC time (when read) 382 output from RTC 310 and a corresponding count value (when read) 186 to some of a plurality of secondary data sets 380.

With reference to FIG. 9(C), secondary data set 380 may include a plurality of sets each including processing result set 182 and corrected count value 184 in addition to a set of RTC time (when read) 382 and count value (when read) 186. At this time, secondary data set 380 may include only one gateway propagation latency 162. That is, gateway 300 transmits, to server 400, secondary data set 380 including RTC time (when read) 382 output from RTC 310, a corresponding count value (when read) 186, and data (a plurality of processing result sets 182) collected by slave 200 at each of a plurality of timings.

As described above, since only necessary data needs to be transmitted from gateway 300 to server 400, secondary data set 380 may be transmitted with any data configuration.

E. Processing of Generating Collection Data Set 480 (Sequence SQ8)

Next, processing of generating collection data set 480 by server 400 (sequence SQ8 illustrated in FIG. 1) will be described.

Figure 10:
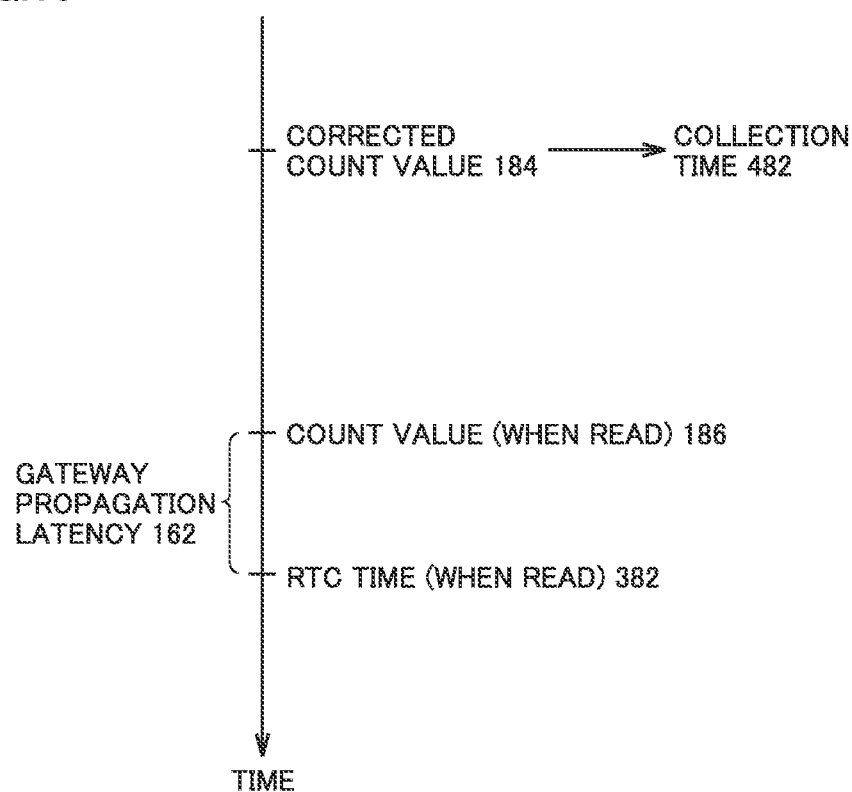
FIG. 10 is a diagram for describing processing of calculating a collection time in the information collecting system according to the present embodiment.

FIG. 10 is a diagram for describing processing of calculating collection time 482 in information collecting system 1 according to the present embodiment. With reference to FIG. 10, collection time 482 means a time corresponding to corrected count value 184.

A time difference corresponding to gateway propagation latency 162 is present between RTC time (when read) 382 and count value (when read) 186. Therefore, a time earlier than RTC time (when read) 382 by gateway propagation latency 162 corresponds to count value (when read) 186.

A time further earlier by a time corresponding to a difference between count value (when read) 186 and corrected count value 184 corresponds to collection time 482.

Therefore, collection time 482 is calculated in accordance with collection time 482=RTC time (when read) 382−gateway propagation latency 162−(count value (when read) 186−corrected count value 184)×time width per count value.

Note that RTC time (when read) 382 and count value (when read) 186 are acquired one after another, so that when collection time 482 is calculated, RTC time (when read) 382 and count value (when read) 186 closest to corrected count value 184 corresponding to collection time 482 may be selected.

Server 400 calculates, from corrected count value 184 included in secondary data set 380, a corresponding collection time 482 and generates collection data set 480.

Collection data set 480 thus generated may be stored one after another into server 400, a database separate from server 400, or the like. Collection time 482 is associated with each processing result set 182 included in collection data set 480, so that it is possible to extract data of a necessary time section according to the purpose of use or the like.

F. Processing Procedure

Next, an example of a processing procedure in information collecting system 1 according to the present embodiment will be described.

Figure 11:
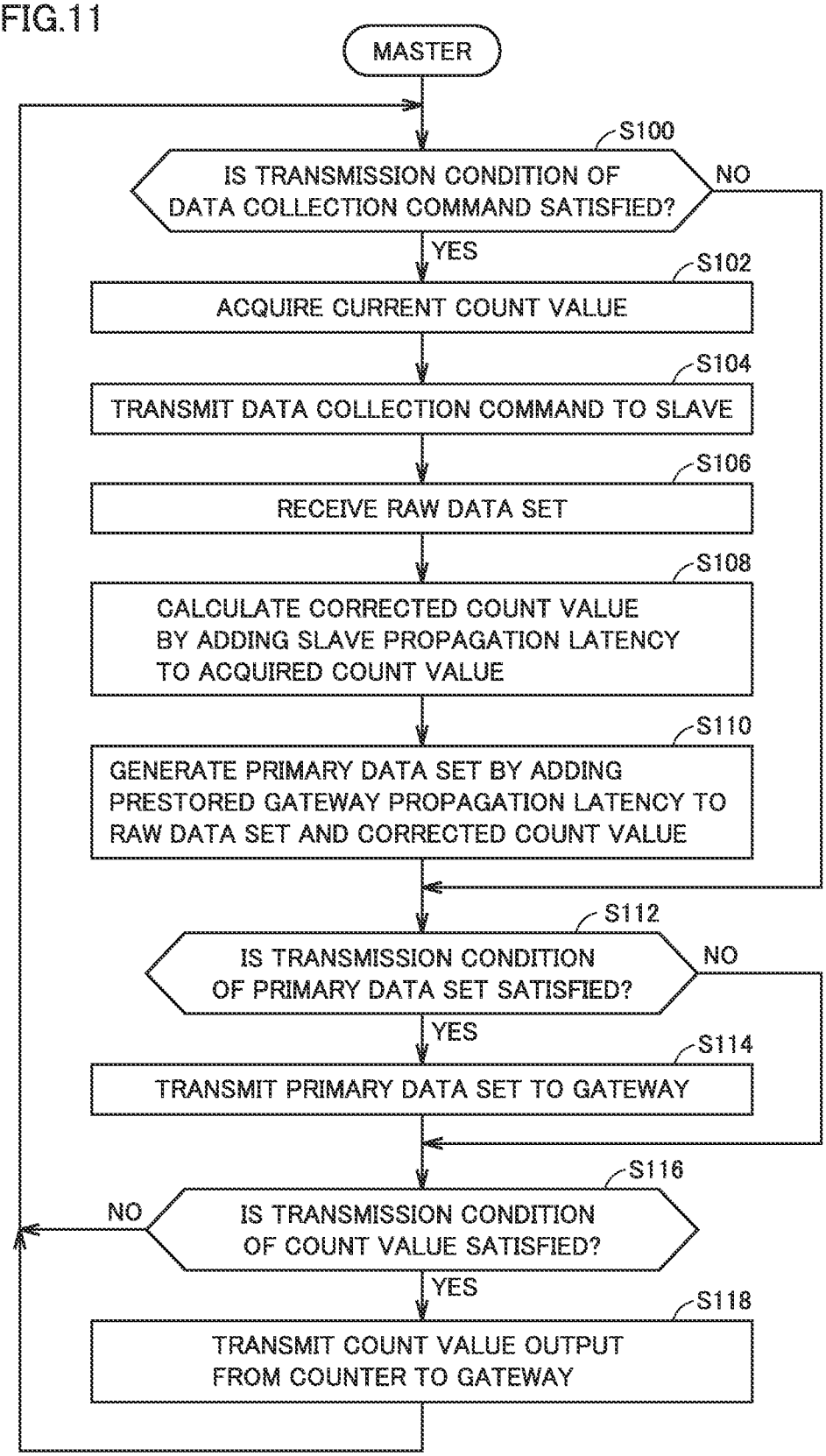
FIG. 11 is a flowchart illustrating an example of a processing procedure to be performed by the master of the information collecting system according to the present embodiment.

FIG. 11 is a flowchart illustrating an example of a processing procedure to be performed by master 100 of information collecting system 1 according to the present embodiment. Each step illustrated in FIG. 11 is typically implemented by system program 128 executed by processor 122 of master 100.

With reference to FIG. 11, master 100 determines whether a transmission condition of the data collection command is satisfied (step S100). Examples of the transmission condition of the data collection command include arrival of a predetermined transmission period and an occurrence of a predetermined event. When the transmission condition of the data collection command is not satisfied (NO in step S100), steps S102 to S110 are skipped.

When the transmission condition of the data collection command is satisfied (YES in step S100), master 100 acquires the current count value (step S102) and transmits the data collection command to slave 200 (step S104). In response to the data collection command, slave 200 collects data from one or more sensing devices and transmits, to master 100, raw data set 260 including the data thus collected.

Upon receipt of raw data set 260 from slave 200 (step S106), master 100 calculates corrected count value 184 by adding slave propagation latency 160 to the count value acquired in step S102 (step S108). Then, master 100 generates primary data set 180 by adding prestored gateway propagation latency 162 to raw data set 260 and corrected count value 184 (step S110). As described above, master 100 adds the count value output from counter 110 at the timing of the collection of data (raw data set 260) by slave 200 to the data (raw data set 260) collected by slave 200 to generate primary data set 180.

Subsequently, master 100 determines whether a transmission condition of primary data set 180 is satisfied (step S112). Examples of the transmission condition of primary data set 180 includes arrival of a predetermined transmission period or an occurrence of a predetermined event.

When the transmission condition of primary data set 180 is satisfied (YES in step S112), master 100 transmits primary data set 180 to gateway 300 (step S114). When the transmission condition of primary data set 180 is not satisfied (NO in step S112), step S114 is skipped.

Further, master 100 determines whether a transmission condition of the count value is satisfied (step S116). Examples of the transmission condition of the count value include arrival of a predetermined transmission period or an occurrence of a predetermined event (for example, receipt of a transmission request from gateway 300).

When the transmission condition of the count value is satisfied (YES in step S116), master 100 transmits the count value output from counter 110 to gateway 300 (step S118). As described above, when the predetermined condition is satisfied, master 100 transmits the count value (second count value) output from counter 110 to gateway 300. When the transmission condition of the count value is not satisfied (NO in step S116), step S118 is skipped.

Then, step S100 and the subsequent steps are repeated.

FIG. 12 is a flowchart illustrating an example of a processing procedure to be performed by gateway 300 of information collecting system 1 according to the present embodiment. Each step illustrated in FIG. 12 is implemented by system program 328 executed by processor 322 of gateway 300.

With reference to FIG. 12, gateway 300 determines whether primary data set 180 has been received from master 100 (step S200). When primary data set 180 has been received from master 100 (YES in step S200), gateway 300 stores primary data set 180 thus received (step S202). When primary data set 180 has not been received from master 100 (NO in step S200), S202 is skipped.

Gateway 300 determines whether the count value has been received from master 100 (step S204). When the count value has been received from master 100 (YES in step S204), gateway 300 acquires the RTC time at the timing of the receipt of the count value (step S206), and stores the RTC time thus acquired as RTC time (when read) 382 and count value (when read) 186 (step S208). As described above, gateway 300 associates the time output from RTC 310 when receiving the count value (second count value) from master 100 with the count value thus received. When the count value has not been received from master 100 (NO in step S204), steps S206 and S208 are skipped.

Subsequently, gateway 300 determines whether a transmission condition of secondary data set 380 is satisfied (step S210). Examples of the transmission condition of secondary data set 380 include arrival of a predetermined transmission period or an occurrence of a predetermined event.

When the transmission condition of secondary data set 380 is satisfied (YES in step S210), gateway 300 generates secondary data set 380 by adding RTC time (when read) 382 and count value (when read) 186 to primary data set 180 (step S212), and transmits secondary data set 380 to server 400 (step S214). As described above, gateway 300 generates secondary data set 380 by adding the correspondence relationship between the RTC time (RTC time (when read) 382) output from RTC 310 and the count value (count value (when read) 186) output from counter 110 of master 100 to primary data set 180. When the transmission condition of secondary data set 380 is not satisfied (NO in step S210), steps S212 and S214 are skipped.

Then, step S200 and the subsequent steps are repeated.

FIG. 13 is a flowchart illustrating an example of a processing procedure to be performed by server 400 of information collecting system 1 according to the present embodiment. Each step illustrated in FIG. 13 is implemented by a program executed by the processor of server 400.

With reference to FIG. 13, server 400 determines whether secondary data set 380 has been received from gateway 300 (step S300). When secondary data set 380 has not been received from gateway 300 (NO in step S300), step S300 and the subsequent steps are repeated.

When secondary data set 380 has been received from gateway 300 (YES in step S300), server 400 calculates collection time 482 corresponding to corrected count value 184 on the basis of RTC time (when read) 382, gateway propagation latency 162, count value (when read) 186, and corrected count value 184 included in secondary data set 380 thus received (step S302). Then, server 400 stores processing result set 182 with processing result set 182 associated with collection time 482 thus calculated (step S304). Then, step S300 and the subsequent steps are repeated.

G. Modification

Any modification as described below can be made to the above-described embodiment.

g1: Slave Propagation Latency 160

In the above-described embodiment, a configuration example where slave propagation latency 160 is prepared in advance in order to correct the latency between the transmission of the data collection command from master 100 to slave 200 and the actual collection of data has been described. Further, slave propagation latency 160 may be prepared for each slave 200.

Slave propagation latency 160 may be measured by means of any method. For example, slave propagation latency 160 may be calculated through measurement of a time between the transmission of the data collection command from master 100 and the receipt of actual data from slave 200.

On the other hand, in a case where slave propagation latency 160 is negligibly small relative to required accuracy of collection time 482, the correction using slave propagation latency 160 may be skipped. That is, slave propagation latency 160 may be regarded as zero. In this case, the timing when master 100 receives raw data set 260 from slave 200 can be regarded as the timing when slave 200 collects data (raw data set 260). That is, the timing when slave 200 (second device) collects data may include the timing when master 100 (first device) receives raw data set 260.

g2: Gateway Propagation Latency 162

In the above-described embodiment, in order to associate the RTC time output from RTC 310 of gateway 300 with the count value output from counter 110 of master 100, the magnitude of latency between gateway 300 and master 100 is set as gateway propagation latency 162. Note that an RTC may be provided in server 400, and an RTC time output from RTC of server 400 may be associated with the count value output from counter 110 of master 100.

In this case, server 400 is configured to perform processing of acquiring the count value output from counter 110 of master 100 instead of gateway 300. Therefore, the magnitude of propagation latency between server 400 and master 100 is set as gateway propagation latency 162.

As described above, gateway propagation latency 162 is used to correct not only latency related to the name of "gateway", but also latency in associating the RTC time output from RTC provided in any device with the count value output from counter 110 of master 100.

g3: Raw Data Set 260

For the processing of transmitting the data collected by each slave 200 to master 100, any data structure may be employed. For convenience of description, an example where data of a plurality of channels collected over one collection period is stored into one raw data set 260 has been described, but data of a plurality of channels collected over a plurality of collection periods may be combined into one raw data set 260. On the other hand, data of one channel collected over one collection period may be used as raw data set 260. Alternatively, data of one channel (in other words, time-series data of one channel) collected over a plurality of collection periods may be combined into one raw data set 260.

As described above, data to be included in one raw data set 260 transmitted from slave 200 to master 100 may be designed as desired according to, for example, processing performance or communication performance of master 100 and slave 200.

g4: Processing of Calculating Collection Time 482

In the above-described embodiment, a processing example where server 400 calculates collection time 482 associated with processing result set 182 has been described. Note that collection time 482 can be calculated as long as the set of RTC time (when read) 382 and count value (when read) 186, and corrected count value 184 can be referred to, so that collection time 482 may be calculated not only by server 400 but also by gateway 300. In this case, collection time 482 may be added to secondary data set 380 that is transmitted from gateway 300 to server 400.

Furthermore, collection time 482 may be calculated as needed when processing result set 182 is used. That is, server 400 may store secondary data set 380 as it is and calculate collection time 482 or the like when secondary data set 380 is used.

g5: Position Information

In the above-described embodiment, a processing example where collection time 482 is added to data measured by sensing device 250, and the data is collected has been described. In addition to collection time 482, position information indicating at which position the data has been collected may be collected. The position information may be acquired using a global positioning system (GPS) or the like, or may be acquired using a radio wave of a mobile communication system or the like.

g6: Implementation Example of Gateway 300

Gateway 300 may be implemented using a general-purpose relay device, or may be implemented using some of a programable logic controller (PLC), an industrial personal computer (IPC), a human machine interface (HMI), and the like. As described above, any implementation form may be applied to gateway 300.

H. Advantages

The information collecting system according to the present embodiment manages, using the first count value, the timing when slave 200 collects data from one or more sensing devices, and adds the correspondence relationship between the time output from RTC 310 of gateway 300 and the second count value to primary data set 180. It is possible to calculate, by referring to the correspondence relationship between the time and the second count value, the time when the data is collected on the basis of the first count value, so that time management can be performed with higher accuracy. Further, the use of RTC 310 of gateway 300 eliminates the need of increasing the number of RTCs 310 even in a case where a plurality of masters 100 and a plurality of slaves 200 are placed, and thus makes it possible to suppress an increase in cost involved in time management.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An information collecting system comprising:
   a first device including a counter;
   a second device configured to collect data from one or more sensing devices in response to a command from the first device; and
   a third device including a time-measuring unit configured to manage time,
   wherein the first device is configured to add, to the data collected by the second device, a first count value output from the counter at a timing when the second device collects the data, to generate a first data set, and
   the third device is configured to add, to the first data set, a correspondence relationship between a time output from the time-measuring unit and a second count value output from the counter of the first device,
   wherein:
   the first device is configured to transmit, only when a predetermined condition is satisfied, a count value output from the counter to the third device as the second count value, and
   the third device is configured to associate a time output from the time-measuring unit when the second count value is received from the first device with the second count value received.

2. The information collecting system according to claim 1, wherein the first device is configured to transmit, to the third device, second latency required between the transmission of the count value from the first device and a receipt of the count value by the third device.

3. The information collecting system according to claim 1, wherein the first device is configured to generate the first data set from a processing result obtained by performing a predetermined operation on the data collected from the one or more sensing devices.

4. The information collecting system according to claim 1, wherein the third device is configured to transmit, to a fourth device, a second data set including the time output from the time-measuring unit, the second count value corresponding to the time, and data collected by the second device at each of a plurality of timings.

5. The information collecting system according to claim 4, wherein the fourth device is configured to calculate a time corresponding to the first count value.

6. The information collecting system according to claim 1, wherein the third device is configured to add the time output from the time-measuring unit and the second count value corresponding to the time to some of a plurality of the first data set.

7. The information collecting system according to claim 1, wherein the second device does not have a counter.

8. The information collecting system according to claim 1, wherein the first device is confirmed to receive raw data from the second device and add, to the received raw data, the first count value to generate the first data set.

9. The information collecting system according to claim 1, wherein the first device is configured to calculate the first count value by correcting a third count value corresponding to a time when the command is transmitted to the second device using first latency required between the transmission of the command and the collection of the data by the second device.

10. An information collecting method that is performed by an information collecting system comprising a first device, the first device including a counter, the information collecting method comprising:

collecting, by a second device, data from one or more sensing devices in response to a command from the first device;

adding, by the first device, a first count value output from the counter at a timing when the second device collects the data to the data collected by the second device, to generate a first data set;

adding, by a third device including a time-measuring unit configured to manage time, a correspondence relationship between a time output from the time-measuring unit and a second count value output from the counter of the first device to the first data set;

transmitting, by the first device, when a predetermined condition is satisfied, a count value output from the counter to the third device as the second count value, and associating, by the third device, a time output from the time-measuring unit when the second count value is received from the first device with the second count value received.

11. The information collecting method according to claim 10, further comprising:

calculating, by the first device, the first count value by correcting a third count value corresponding to a time when the command is transmitted to the second device using first latency required between the transmission of the command and the collection of the data by the second device.

12. The information collecting method according to claim 11, wherein the first latency is prestored in the first device.

13. The information collecting method according to claim 10, further comprising:

transmitting, by the first device, to the third device, second latency required between the transmission of the count value from the first device and a receipt of the count value by the third device.

14. The information collecting method according to claim 10, further comprising:

generating, by the first device, the first data set from a processing result obtained by performing a predetermined operation on the data collected from the one or more sensing devices.

15. The information collecting method according to claim 10, further comprising:

transmitting, by the third device, to a fourth device, a second data set including the time output from the time-measuring unit, the second count value corresponding to the time, and data collected by the second device at each of a plurality of timings.

16. The information collecting method according to claim 15, further comprising:

calculating, by the fourth device, a time corresponding to the first count value.

17. The information collecting method according to claim 10, further comprising:

adding, by the third device, the time output from the time-measuring unit and the second count value corresponding to the time to some of a plurality of the first data set.

18. The information collecting system according to claim 9, wherein the first latency is prestored in the first device.

* * * * *